US007551583B1

(12) United States Patent
Gazzard

(10) Patent No.: US 7,551,583 B1
(45) Date of Patent: Jun. 23, 2009

(54) METHOD AND SYSTEM FOR COORDINATING OPERATION MODES OF A GPRS NETWORK

(75) Inventor: Daryl Gazzard, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 875 days.

(21) Appl. No.: 10/735,673

(22) Filed: Dec. 16, 2003

(51) Int. Cl.
*H04W 4/00* (2009.01)
*H04W 24/00* (2009.01)

(52) U.S. Cl. ............... 370/331; 370/252; 370/354; 455/423; 455/456.1

(58) Field of Classification Search ............ 370/338, 370/352, 553, 354, 458, 567, 355, 356, 395.42, 370/493, 230.1, 252, 331, 353, 456; 455/567, 455/451, 423, 426.1, 433, 445, 456.1, 458, 455/466, 522; 709/723
See application file for complete search history.

(56) References Cited

U.S. PATENT DOCUMENTS

| | | | | |
|---|---|---|---|---|
| 5,745,695 | A * | 4/1998 | Gilchrist et al. ............ 709/227 |
| 6,370,390 | B1 * | 4/2002 | Salin et al. ................. 455/466 |
| 6,442,159 | B2 * | 8/2002 | Josse et al. ................. 370/354 |
| 6,463,054 | B1 * | 10/2002 | Mazur et al. ................ 370/352 |
| 6,847,610 | B1 * | 1/2005 | Suumaki et al. .......... 370/230.1 |
| 6,888,822 | B2 * | 5/2005 | Svensson et al. ............ 370/353 |
| 6,898,425 | B1 * | 5/2005 | Wilhelmsson et al. ....... 455/423 |
| 6,920,116 | B1 * | 7/2005 | Hossain et al. .............. 370/329 |
| 6,996,092 | B1 * | 2/2006 | Maguire et al. ............. 370/356 |
| 7,006,478 | B1 * | 2/2006 | Mizell et al. ................ 370/338 |
| 7,126,940 | B2 * | 10/2006 | Vanttinen et al. ........... 370/352 |
| 7,328,008 | B2 * | 2/2008 | Bjorken ..................... 455/423 |
| 7,346,031 | B2 * | 3/2008 | Demarez et al. ............ 370/331 |
| 2001/0049731 | A1 * | 12/2001 | Kuusinen et al. ........... 709/223 |
| 2002/0006125 | A1 * | 1/2002 | Josse et al. ................. 370/354 |
| 2002/0061756 | A1 * | 5/2002 | Bleckert et al. ............. 455/458 |
| 2002/0085537 | A1 * | 7/2002 | Carlsson et al. ............ 370/352 |
| 2002/0110116 | A1 * | 8/2002 | Aaltonen .................... 370/352 |
| 2002/0137532 | A1 * | 9/2002 | Landais et al. .............. 455/466 |
| 2002/0151307 | A1 * | 10/2002 | Demarez et al. ............ 455/445 |
| 2004/0017798 | A1 * | 1/2004 | Hurtta et al. ................ 370/352 |
| 2004/0037269 | A1 * | 2/2004 | Lundin ....................... 370/352 |

OTHER PUBLICATIONS

European Telecommunications standards Institute Digital cellular telecommunications system(Phase 2+) ; Universal Mobile Telecommuunications System (UMTS); General Packet Radio Service (GPRS) Service description; Stage 2( 3GPP TS 23.060 version 3.15.0 Release 1999) ETSI TS 123 060 V3.15.0(Jun. 2003).*
3GPP TS 23.060 V3.15.0 (Jun. 2003) 3rd Generation Partnership Project; Technical Specification Group Services and System Aspects.*
3GPP TS 23.060 V3.15.0 (Jun. 2003) 3rd Generation Partnership Project; Technical Specification Group Services and System Aspects.*
3GPP TS 23.060 V3.15.0 (Jun. 2003);3rd Generation Partnership Project; Technical Specification Group Services and System Aspects( 1999).*
"GPRS White Paper", 2000 Cisco Systems, Inc. pp. 1-19.

* cited by examiner

*Primary Examiner*—Aung S Moe
*Assistant Examiner*—Awet Haile
(74) *Attorney, Agent, or Firm*—MIchael J. Donohue; Davis Wright Tremaine LLP

(57) ABSTRACT

A system and method for coordinating network operation modes of a GPRS network is disclosed. The system includes a database storing a preferred list of network operation modes of the GPRS network. A SGSN detects the status of an interface for GPRS packet data services and reports the status to a BSC. BSC decides which network operation mode to use based on the preferred list. The GPRS network is then switched to the preferred network operation mode.

21 Claims, 9 Drawing Sheets

METHOD AND SYSTEM FOR COORDINATING OPERATION MODES OF A GPRS NETWORK

BACKGROUND OF THE INVENTION

1. Field of the Invention

The present invention relates generally to communications methods and systems, and more particularly, to providing selections of operation modes of such communications systems.

2. Description of Related Art

A General Packet Radio System ("GPRS") is a service that provides data packet communications for mobile Global system for Mobile Communications (GSM) and time-division multiple access (TDMA) users. In addition to GSM, GPRS also provides services to other digital cellular networks, such as DCS and PCS. As is known, GPRS uses this packet-mode technique to transfer high-speed and low-speed data and signaling in an efficient manner over GSM radio networks.

GPRS provides a variety of new and unique services to mobile wireless subscribers. For example, GPRS can maintain constant voice and data communications while mobile subscribers are in transit. Subscribers also are enabled to obtain connectivity whenever needed, regardless of location and without a lengthy login session. Via a GPRS mobile telephone, a subscriber can maintain an online connection while initiating a communication, without an overhead of setting up a data call. Finally, localization enables subscribers to obtain information that is relevant to their respective current locations. For example, GPRS enables location-based services that provide information about weather, traffic, restaurants, or retail stores, based on a subscriber's location at a particular moment in time.

FIG. 1 illustrates a basic architecture of a GPRS network 100 and a data transfer route in the GPRS network. The GPRS network attempts to reuse the existing GSM network element as much as possible. In order to effectively build a packet-based mobile cellular network, some new network elements, interfaces and protocols that handle packet traffic are also required. For example, the existing Mobile Station Switch Centers ("MSC's") are based upon circuit-switched central-office technology and cannot handle packet traffic. Therefore, enabling GPRS on a GSM network requires the addition of two core modules, a Serving GPRS Service Node ("SGSN") 110 and a Gateway GPRS Service Node ("GGSN") 112, as shown in FIG. 1. GGSN 112 acts as a gateway between GPRS network 100 and an external IP network 114 such as an Internet or an x.25 Network, or another GPRS network (to facilitate GPRS roaming), and is connected with SGSN 110 via an IP-based GPRS backbone network 124. SGSN 110 is at the same level as MSC 118, and can be viewed as a "packet-switched MSC" (mobile station switch center). SGSN 110 provides packet routings to and from its service area for all MS's in that service area. SGSN 110 also detects new GPRS MS's in a given service area, processes registration of new MSs, and keeps a record of their respective locations inside the given area.

MS 102 is physical equipment used by the mobile subscribers, such as a mobile telephone or a laptop computer, which is GPRS-attached and can handle an enhanced air interface in GPRS network 100 and can packetize traffic directly. The GPRS-attached MSs may include a high-speed version of current telephones to support high-speed data access, a PDA (Personal Digital Assistant) device with an embedded GSM telephone, and PC cards for laptop computers. All MS's profiles are preserved in home location registers ("HLR") 120 that are accessible by SGSN 110 and GSM MSC 118. A physical link (e.g., interface Gs) can be established and maintained between an MSC and a specific SGSN in each mobile network. The Gs interface allows the MSC to be aware of the status of a subscriber in the SGSN. The presence of the Gs interface facilitates combined signaling procedures from the MS.

SGSN 110 is also coupled to a BSC (Base Station Controller) 106 via a Frame Relay connection. BSC 106 manages radio resources including Base Transceiver Station ("BTS") 104. BTS 104, is physical equipment, such as a radio tower, that is used to transmit radio frequencies over an air interface. The BSC 106 may be connected to several BTS's. Each BTS may serve more than one MS. The BSC and BTS, as a whole, are generally referred to as a BSS (Base Station System). To be utilized in the GPRS network, BSC 106 is linked to a Packet Control Unit ("PCU") 108 that provides a physical and logical data interface out of the BSS for packet data traffic. PCU 108 converts packet data to/from SGSN 110 into a format that can be transferred to server 116/MS 102 and implements quality of service (QoS) measurements. For example, when either voice or data traffic is originated at the mobile subscriber, it is transported over the air interface to BTS 104, and from BTS 104 to BSC 106 in the same way as in a standard GSM call. However, at the output of BSC 106, the traffic is separated. Circuit-switched voice is sent to MSC 118 via circuit-switched channels (through interface A) per standard GSM, and data is sent to SGSN 110 via PCU 108 over the Frame Relay Interface (through interface Gb) and packet-switched signaling channels (through interface Gs).

Currently, the GPRS network can be designed to operate in three network operation modes (NOM1, NOM2, and NOM3), which are shown in FIGS. 2 and 3. The network operation mode of the GPRS network is indicated by a parameter transmitted in system information messages within a cell that dictates to a GPRS MS where to listen for paging messages and how to signal towards the core network. The network operation mode represents the capabilities of the GPRS network. In a NOM1 network, a MS can receive pages from the circuit switched domain (voice call) when engaged in a data call. The MS can suspend the data call or take both simultaneously, depending on the ability of the MS. In a NOM2 network, when engaged in a data call, pages may not be received from the circuit switched domain, since the MS is receiving data and not listening to the paging channel. In a NOM3 network, the MS can monitor pages from a CS network while receiving data and vice versa. However, it is very difficult to achieve in reality due to the processing power required.

There are also three classes of GPRS MS's, Class A, B, or C. These various GPRS MS's support various services. For example, a class A MS supports GPRS and other GSM services (such as SMS and voice) simultaneously, such that a class A MS can use circuit-switched voice and GPRS data services at the same time. A class B MS can monitor GSM and GPRS channels simultaneously, but can only support one of these service at one time. That is, the class B MS can simultaneously register circuit-switched voice and packet-switch data services but may only use one kind of service at a time. A class C MS supports either voice only or data only and thus cannot be simultaneously attached. The subscriber must select which service to connect to. Therefore, a class C MS can make or receive calls from only the manually (or default) selective service. The service that is not selected is not reachable. All classes of the MS's can operate in all network operation modes (NOM1, NOM2, and NOM3).

A GPRS MS, in either class, has three states: idle, standby, and active. Data is transmitted between a MS and the GPRS network only when the MS is in the active state because in the active state, the GPRS network knows the location of the MS and has an active connection. However, in the idle and standby state, the location of the MS is known only as to which cell (idle) or routing area (standby) it is in. (Each routing area may include more than one cell within a GSM location area.) Therefore, when the network wants to send a packet to a MS that is in the standby state, the MS must be paged. When the MS responds to the page from the BSS/SGSN, the SGSN now has an established connection and packets can be sent to the MS. When packets are sent/received (connection established), the MS is allocated in a Temporary Block Flow (TBF). When a TBF is allocated, this is the situation where paging coordination is required between the MSC and SGSN for circuit switched pages to be received.

FIG. 2 is a diagram showing the first network operation mode NOM1 of the GPRS network, in which GRPS MS 201 is attached to, through BSC 202, both SGSN 203 via interfaces Gb and Gs and to other GSM services through MSC 204 via interface A, and MS 201 supports simultaneous operation of GPRS and other GSM services. As shown, in NOM1, the network sends all paging messages for GRPS MS 201 either on a Common Control Channel (CCCH) or the GPRS paging channel or on a GRPS traffic channel (if a data transfer is in progress), such as interfaces Gs and Gb. MS 201 only needs to monitor one paging channel thus allowing it to "sleep" longer. Further, the paging load could be reduced since paging is performed on the routing area level.

FIG. 3 is a diagram illustrating the second and third network operation modes NOM2 and NOM3 of the GPRS network, in which GPRS MS 301 is attached to, through BSC 302, both SGSN 303 via interface Gb and other GSM services through MSC 304 via interface A and can only operate one set of services at a time. In NOM2, the network sends all paging messages for GPRS MS 301 out on the CCCH. The MS must monitor this channel even when allocated a GPRS data channel. In NOM3, the network sends out the CS paging for GPRS MS 301 on the CCCH, and GPRS paging out on a Packet Paging channel (PPCH). If PPCH are present in the cell, then MS 301 must monitor both the CCCH and the PPCH channels. The CS paging occurs at the Location Area level and the PS paging occurs at the cell or Routing Area level.

The primary difference between NOM1, NOM2 and NOM3 is that paging and signaling coordinate in NOM1 to occur between MSC 203 and SGSN 204. The primary difference between NOM2 and NOM3 is that in NOM 3, the GRPS MS 301 can be required to monitor different paging channels. NOM1 has two flavors, one with different paging channels for CS only and CS/PS combined pages (PPCH), and one with a single, common paging channel for use by both CS and PS pages.

Currently, the MS receives the network operation mode from system information transmitted within the cells. However, there is no coordination between each node (BSC, SGSN and MSC) that determines what operation mode the network can support. Since the network operation mode indicates how the MS signals and receives signals from the network, it is possible for the MS to perform or behave in a manner indicated by the received mode of operation, and for other nodes in the network to expect a different behavior. This can result in prolonged loss of service for the MS.

Accordingly, a communications system and method that provides more flexible communications service to MS subscribers is thus desirable.

SUMMARY OF THE INVENTION

An object of the present invention is to provide a method and system for coordinating operation modes of a GPRS network. The present invention can automatically switch the operation mode of the GPRS network based on the status of an interface between a MSC and a SGSN so that the GPRS network can provide more flexible and effective communications services.

In accordance with an embodiment of the present invention, a method for coordinating network operation modes of a GPRS network is disclosed, in which a preferred list of operation modes is stored. Based on the preferred list of operation modes, the method determines what second operation mode is supported and route the paging messages through the second operation mode if a current operation mode can not be supported due to a failure within the network.

In accordance with an embodiment of the present invention, a method for coordinating operation modes of a GPRS network comprises transmitting a paging message to a mobile subscriber through a primary network operation mode that the mobile subscriber is registered for the GPRS network. If the primary network operation mode fails, the method automatically switches the transmission of the paging message through a secondary network operation mode that the mobile subscriber is registered for. The method switches back the transmission of further paging messages through the primary network operation mode when the primary network operation mode is recovered.

In accordance with another embodiment of the present invention, a method for coordinating operation modes of a GPRS network comprises transmitting a paging message to a mobile subscriber via one of a first routing and a second routing based on a preferred list of the mobile subscriber. In the first routing, the paging message is sent via a first interface and a second interface. In the second routing, the paging message is sent via a third interface. In the case that the first routing is selected as a primary operating mode and the second routing is selected as a secondary operating mode, if the first routing is unavailable for transmitting the paging message, the method transmits the paging message to the mobile subscriber via the second routing. The method then transmits the paging messages via the first routing after the first routing is recovered.

The present invention further provides a system for coordinating operation modes of a GPRS network. The system comprises a MSC for transmitting/receiving calls to/from the mobile subscriber, a BSC for managing the calls transmitted/received to/from the mobile subscriber, a SGSN between the mobile subscribers and the MSC, and a database for storing a preferred list of network operation modes of the GPRS network that the mobile subscriber registers. According to the system, the network operation modes of the GPRS network can be automatically switched according to the registered preferred list of network operation modes based on the interface status between the MSC and the SGSN.

DETAILED DESCRIPTION OF EXEMPLARY EMBODIMENTS

Figure 1:
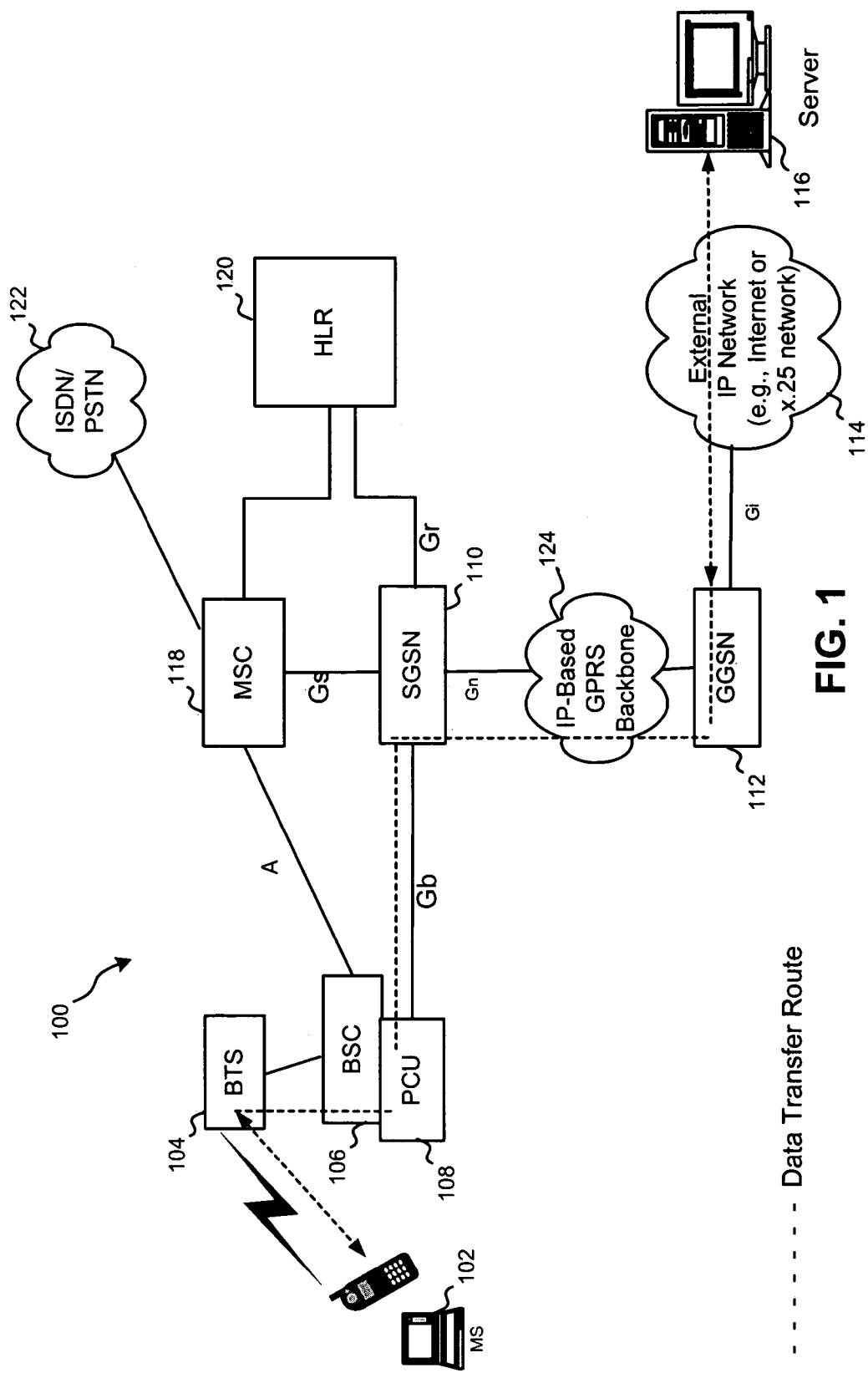
FIG. 1 is a block diagram of an exemplary GPRS network.
Figure 2:
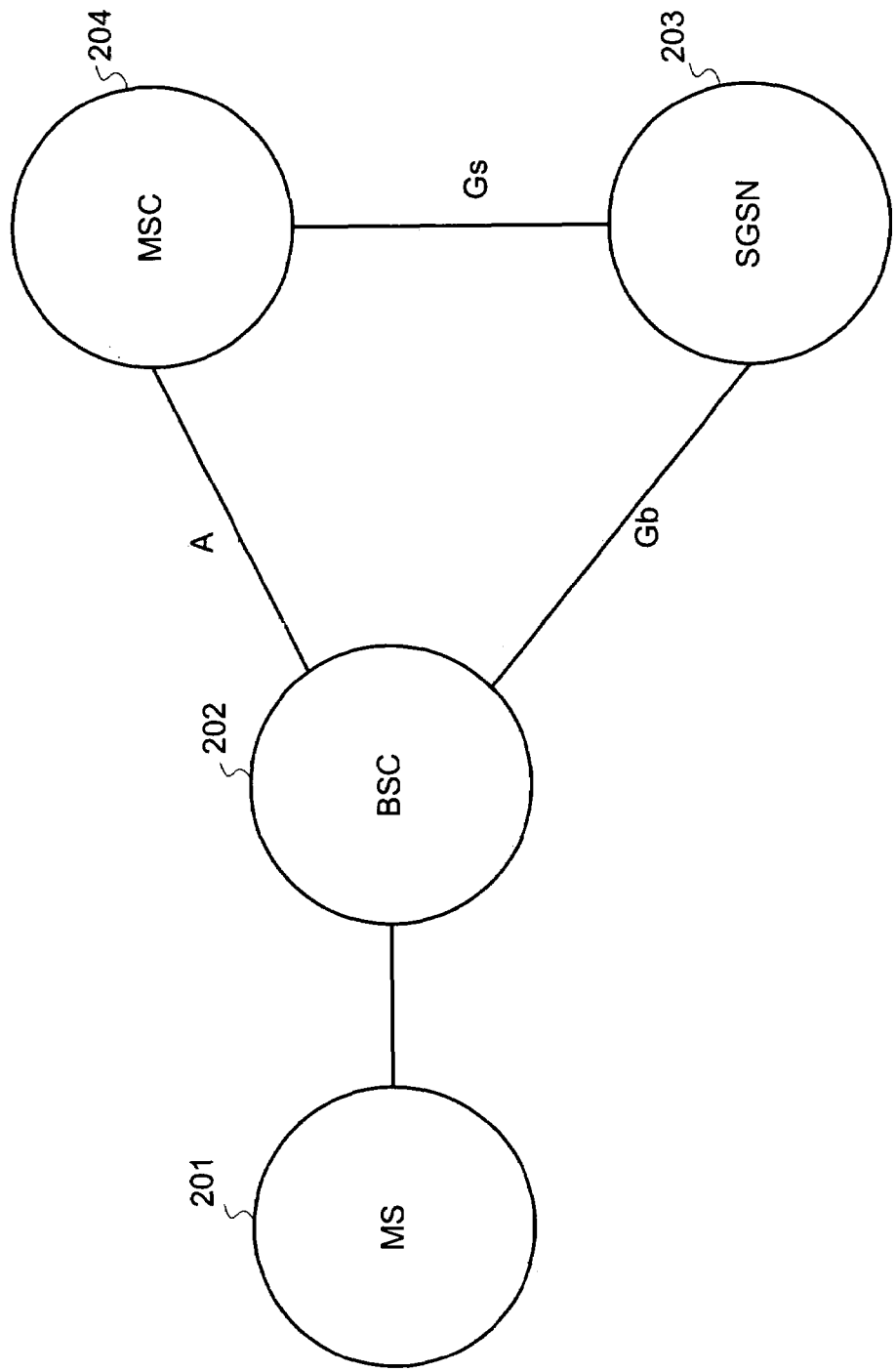
FIG. 2 is a schematic diagram showing a first network operation mode (NOM1) of a GPRS network.
Figure 3:
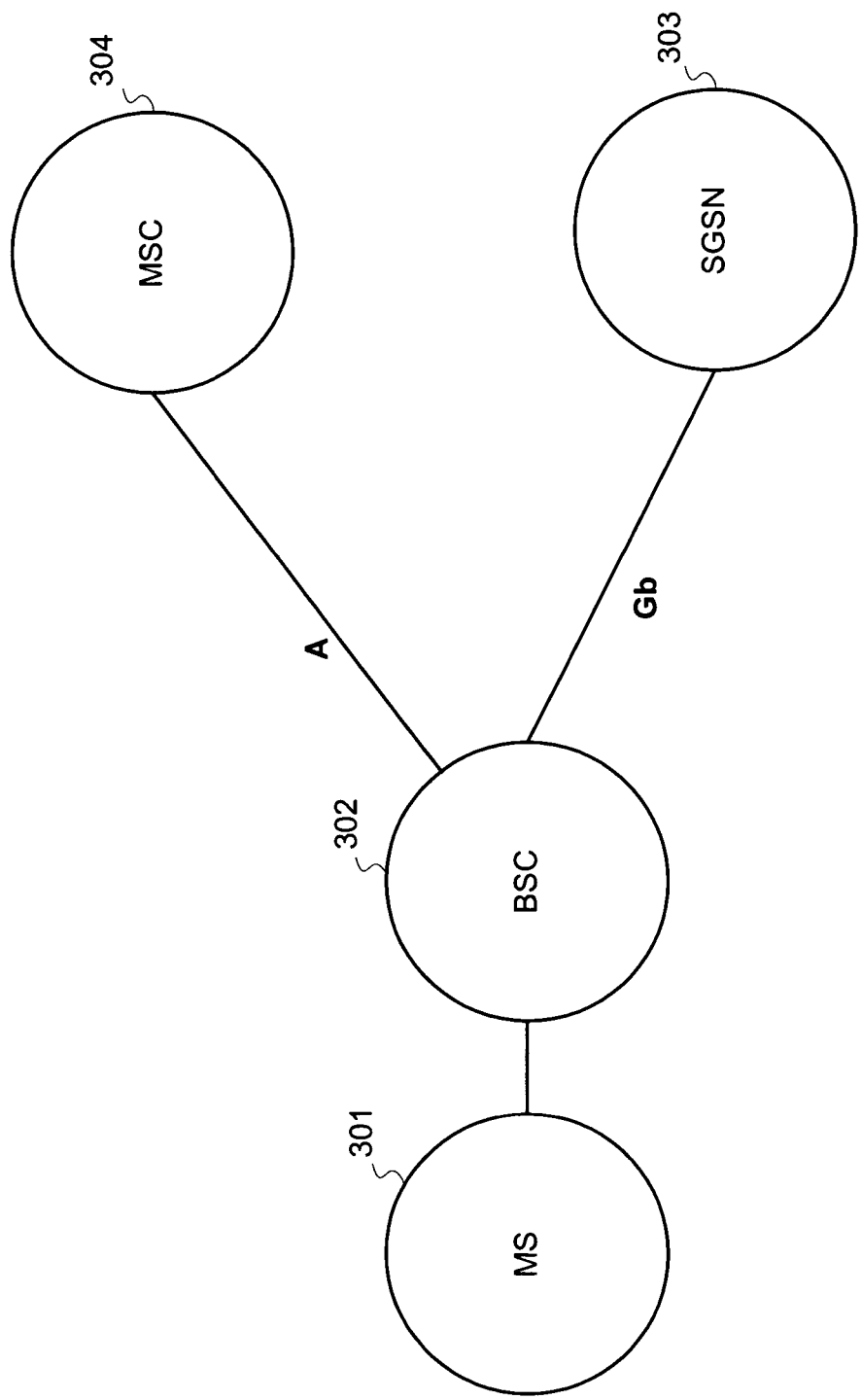
FIG. 3 is a schematic diagram showing a second and third network operation modes (NOM2, NOM3) of a GPRS network.
Figure 4:
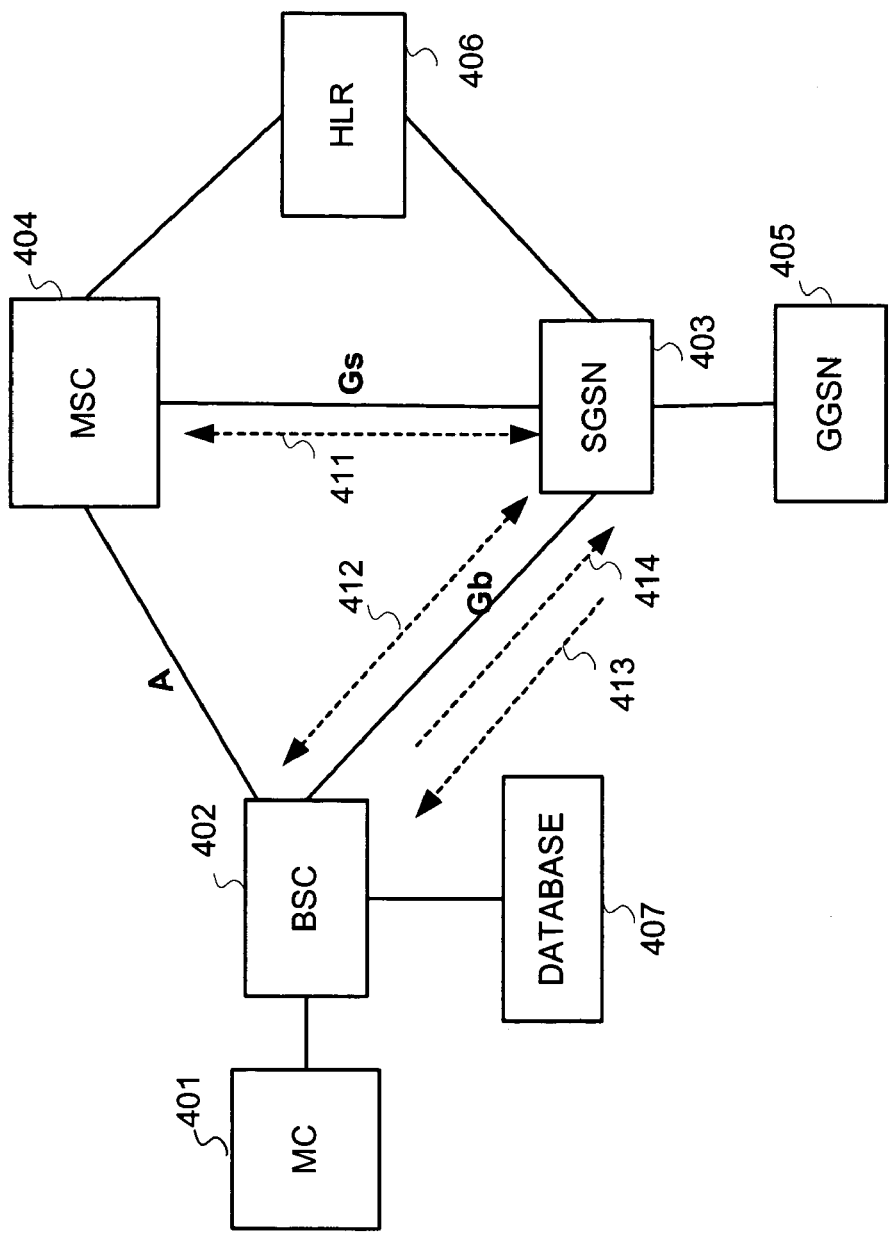
FIG. 4 is a schematic diagram of a system for coordinating operation modes of a GPRS network in accordance with an embodiment of the present invention.

FIG. 4 is a schematic diagram of a system for coordinating operation modes of a GPRS network in accordance with an embodiment of the present invention. The system may include one or more MS's 401 (only one MS is represented), a BSC 402, a MSC 404, a SGSN 403, a GGSN 405, and a HLR 406. BSC 402 manages calls received/transmitted from/to MS 401. MSC 404 is coupled to a GSM network (not shown). SGSN 403 provides packet-switched channels and circuit-switched channels for delivering packet data and voice signals, respectively, between MSC 404 and BSC 402. GGSN 405 serves as a gateway between the GPRS network and other packet data networks (e.g., the internet). HLR 406 stores information regarding MS subscribers.

The system of the present invention can automatically switch operation modes of the network based on a preferred list of operation modes. The preferred list is stored in database 407 of BSC 402. In operation, BSC 402 instructs MS 401 to use an appropriate operation mode based on the stored preferred list. The preferred list may be, for example, (1) NOM1 without PPCH (2) NOM3 (3) NOM2, or (1) NOM1 (2) NOM2, or (1) NOM1 with PPCH, (2) NOM2. In operation, BSC 402 may query SGSN 403 or MSC 404 on the status of interface Gs (that is between SGSN 403 and MSC 404) to ascertain what operation mode to transmit. SGSN 403 or MSC 404 can also signal BSC 402 when a change in status of interface Gs occurs, so that SGSN 403 or MSC 404 can adjust its transmitted operation mode. With the list concept, BSC 402 can also adjust the transmitted operation mode if interface Gb (that is between SGSN 403 and BSC 402) failure occurs.

For example, if a primary operation mode of MS 401 is NOM1, the network transmits, in NOM1, voice signals and packet data from MSC 403 to SGSN 403 and to BSC 402 via interface Gs and Gb, as shown in arrows 411 and 412, and MS 401 listens to packet signaling channels. When interface Gs is unavailable to transmit the signals, SGSN 404 sends a notice message to BSC 402 indicating the failure, as shown in arrow 413. Upon receiving this message, BSC 402 sends an acknowledge message to SGSN 403 that indicates to use NOM2 for transmission, as shown in arrow 414 and changes the NOM transmitted in system information, as indicted by the preferred list. MS 401 in turn listens to circuit-switched channels as there is no packet signaling channels in NOM2, and the signals can be transmitted directly from MSC 404 to BSC 402 through interface A. As MS 401 now listens to the right channels, a loss of the paging signals can be avoided.

Figure 5:
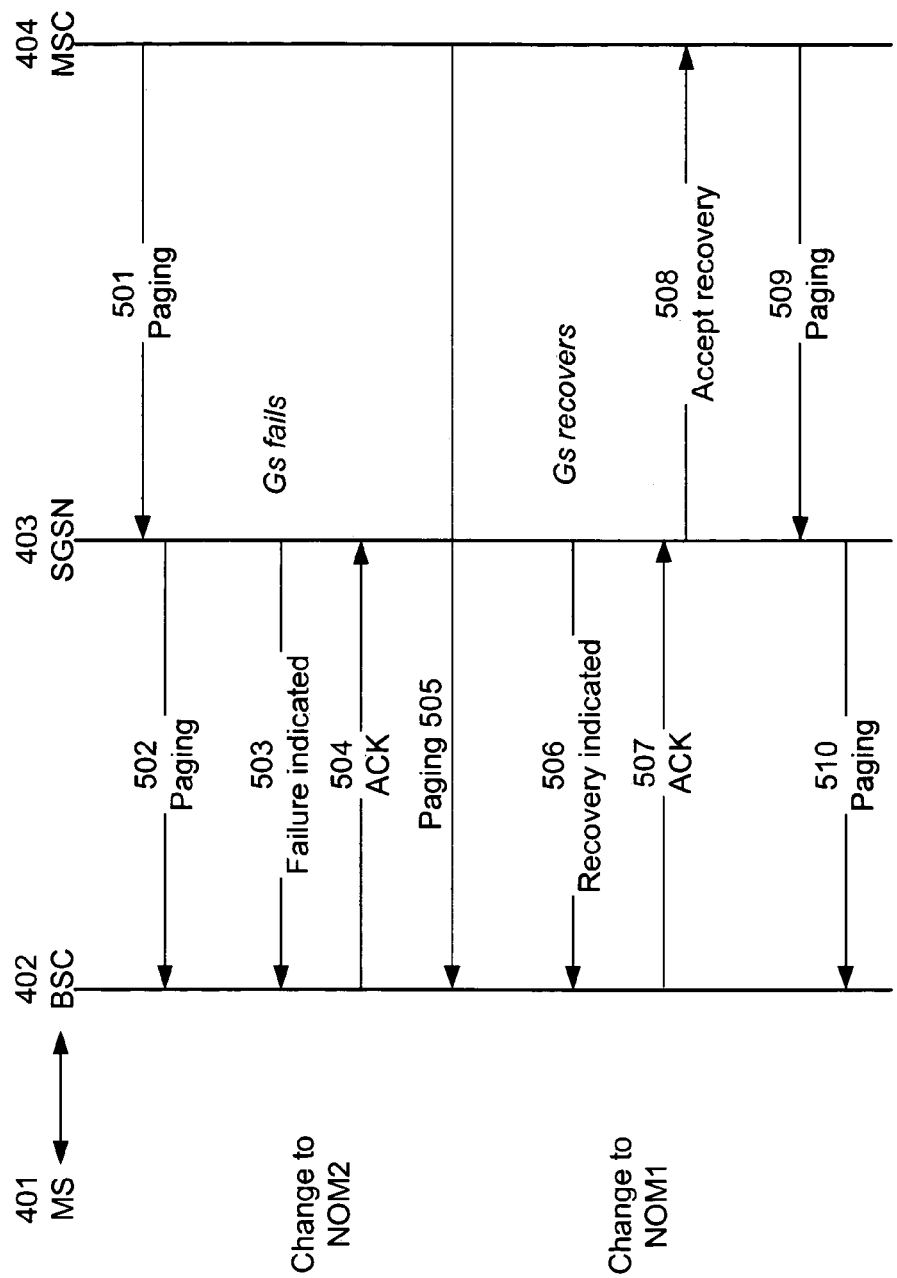
FIG. 5 is a timing diagram for coordinating operating modes of a GPRS network according to a first embodiment of the present invention.

FIG. 5 illustrates a first embodiment of a method employed by the system of FIG. 4 for coordinating operation modes of the GPRS network. Assuming that the network is operated in NOM1 as a primary operation mode, when an incoming call to MS 402 is received by the network, a paging process will be executed from MSC 404 to BSC 402 through SGSN 403. That is, MSC 404 sends a first paging message 501 to SGSN 403, and SGSN 403 in turn sends a second paging message 502 to BSC 402. The second paging message is then downloaded from BSC 402 to MS 401 (shown in FIG. 4) for notifying MS 402 of a new incoming call.

In the case that interface Gs fails, SGSN 403 sends a failure indicated message 503 to BSC 402. Upon receiving this failure indicated message, BSC 402 responds to the failure indicated message by sending an acknowledge message 504 to SGSN 403. After receiving this instruction, MSC 404 sends paging message 505 to BSC 402 directly via the interface A, as in NOM2, until interface Gs recovers.

Once interface Gs recovers, SGSN 403 sends a recovery indicated message 506 to BSC 402, indicating that the operation mode can be returned to NOM1. BSC 402 responds to this recovery message by sending an acknowledge message 507 to SGSN 403 to accept this recovery. SGSN 403 in turn sends an accept recovery message 508 to MSC 404, indicating that the operation mode of the network has switched back to NOM1. Afterward, MSC 404 again transmits paging messages to BSC 402 through SGSN 403, as shown in arrows 509 and 510.

The above embodiment shows that SGSN 403 reports a change of the status of interface Gs to BSC 402 so that BSC 402 can indicate MS 401 to switch the network operation mode to a next preferred operation mode according to the preferred list stored in database 407. Although not shown in this figure, when BSC 402 wishes to send a signal to the GPRS network, BSC 402 can also send a query to either SGSN 403 or MSC 404 to ask for the status of interface Gs so that BSC 402 can send the call in an appropriate network operation mode.

Figure 6:
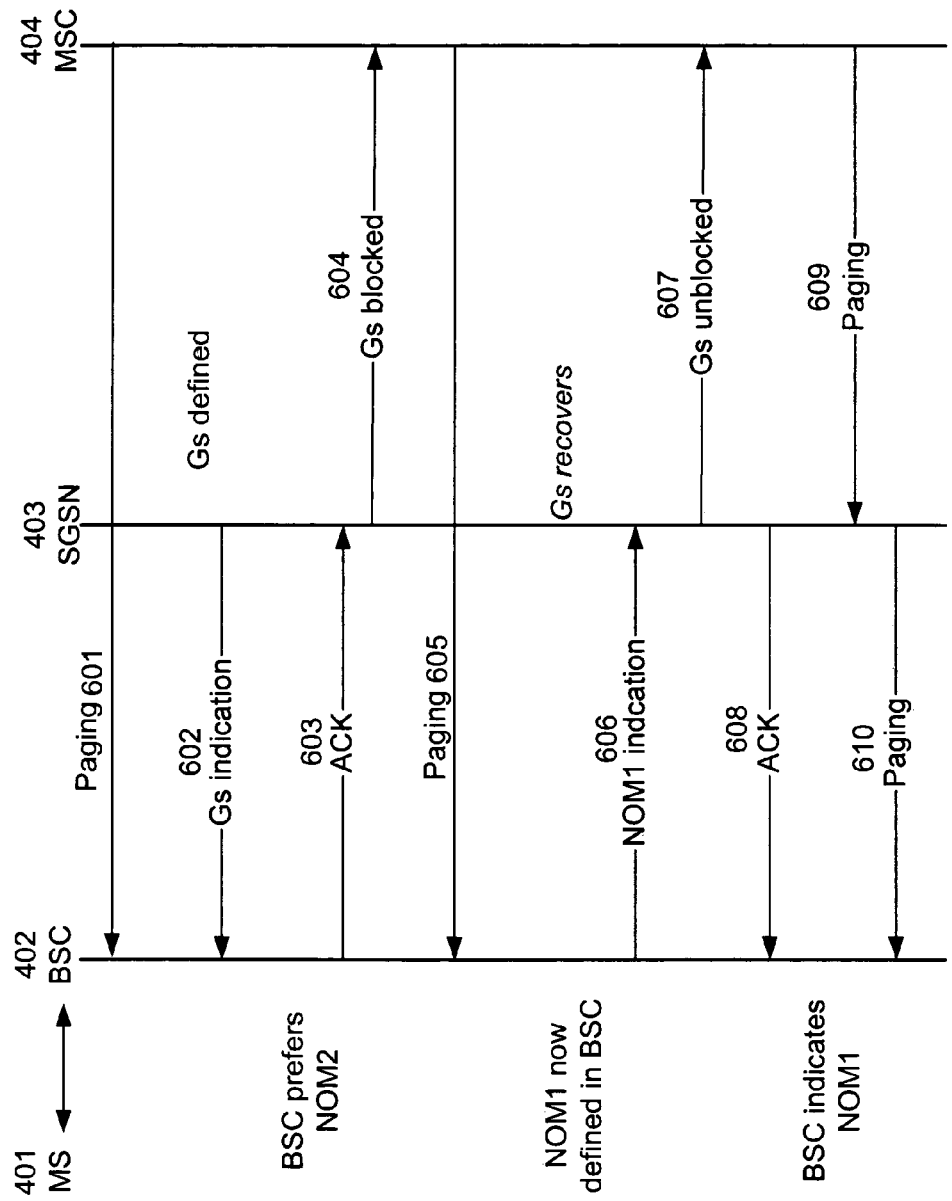
FIG. 6 is timing diagram for coordinating operating modes of a GPRS network according to a second embodiment of the present invention.

FIG. 6 shows a second embodiment of a method employed by the system of FIG. 4 for coordinating operation modes of a GPRS network. In this embodiment, BSC 402 prefers to use NOM2 for signal transmission. Therefore, as shown in arrow 601, the paging message is sent from MSC 404 to BSC 402.

As SGSN 403 is responsible for reporting a change of the status of interface Gs to BSC 402, when interface Gs exists, SGSN 403 sends a Gs indication message 602 to BSC 402. If MS 402 does not have data set up for being transmitted by using the NOM1, BSC 402 can send an acknowledge signal to SGSN 403 in arrow 603, and can instruct SGSN 403 to block interface Gs, as shown in arrow 604. In this manner, the method can assure that the paging message is sent from MSC 404 to BSC 402 under NOM2, as shown in arrow 605.

The embodiment of FIG. 6 is applicable when MS 401 registers and the network is indicating to use NOM2 as its operation mode. As shown in arrow 606, in this case, BSC 402 sends a NOM1-request message to SGSN 403. Upon receiving this message 606, SGSN 403 sends a Gs-unblocked message 607 to MSC 404 indicating that the operation mode has been changed to NOM1, and sends an acknowledge message 608 to BSC 402 indicating interface Gs is now unblocked and a change to NOM1 is completed. Afterward, MSC 404 transmits the paging message in the manner of NOM1; that is, the paging message is sent from MSC 404 to SGSN 403, in arrow 609, and then to BSC 402, in arrow 610.

Accordingly, the method and system in accordance with the present invention provide a flexible management of network operation modes based on the registered preferred list of the MS and the status of interface Gs. As SGSN 403 is capable of reporting any change of the status of interface Gs to BSC 402, BSC 402 has controls on what operation mode to use to route the signals.

In an alternative embodiment, the registered preferred list of operation modes can also be stored in a database of MSC 404 (not shown). In this case, the operation mode of the network is sent from MSC 404 to MS 401 through BSC 402.

The methods as described with reference to FIGS. 5 and 6 provide a solution for coordinating operation modes of the GPRS network. In some cases, network data being set incorrectly in a network so that the network could indicate NOM1 when in fact it cannot perform coordinated signaling. When this happens, MS 402 will not monitor the correct channels and so will fail to get service. To prevent this from happening, the network needs to ensure that NOM1 is only transmitted when coordination is possible. In doing so, another embodiment of the present invention reserves a BTS Virtual Connection Identifier (BVCI) between BSC 402 and SGSN 403 for coordinating the network operation mode. The BVCI is unblocked if the network is able to support NOM1 and would be blocked or left blocked if the network cannot support NOM1 (i.e., NOM1 is failed).

Figure 7:
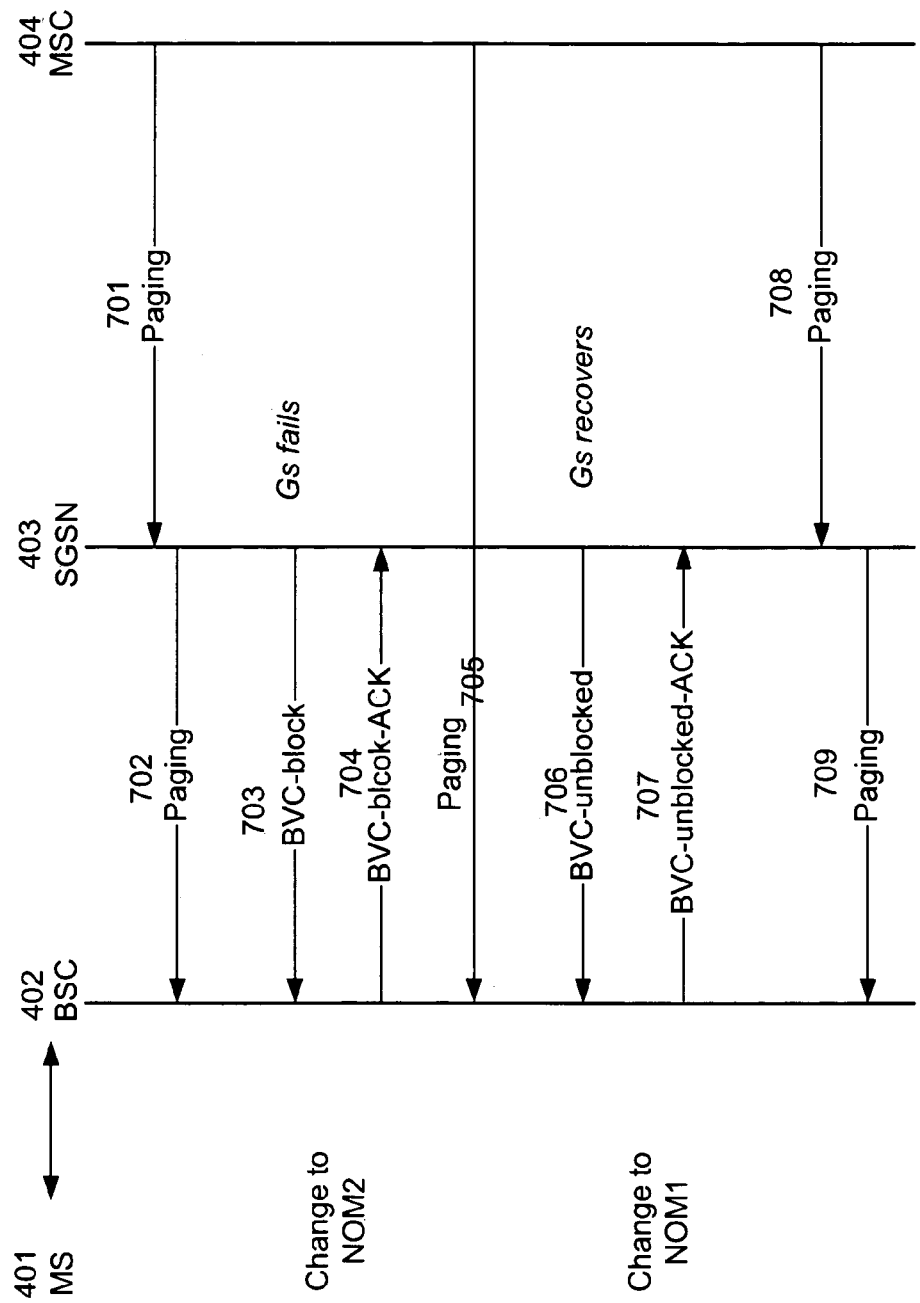
FIG. 7 is timing diagram for coordinating operating modes of a GPRS network according to a third embodiment of the present invention.
Figure 8:
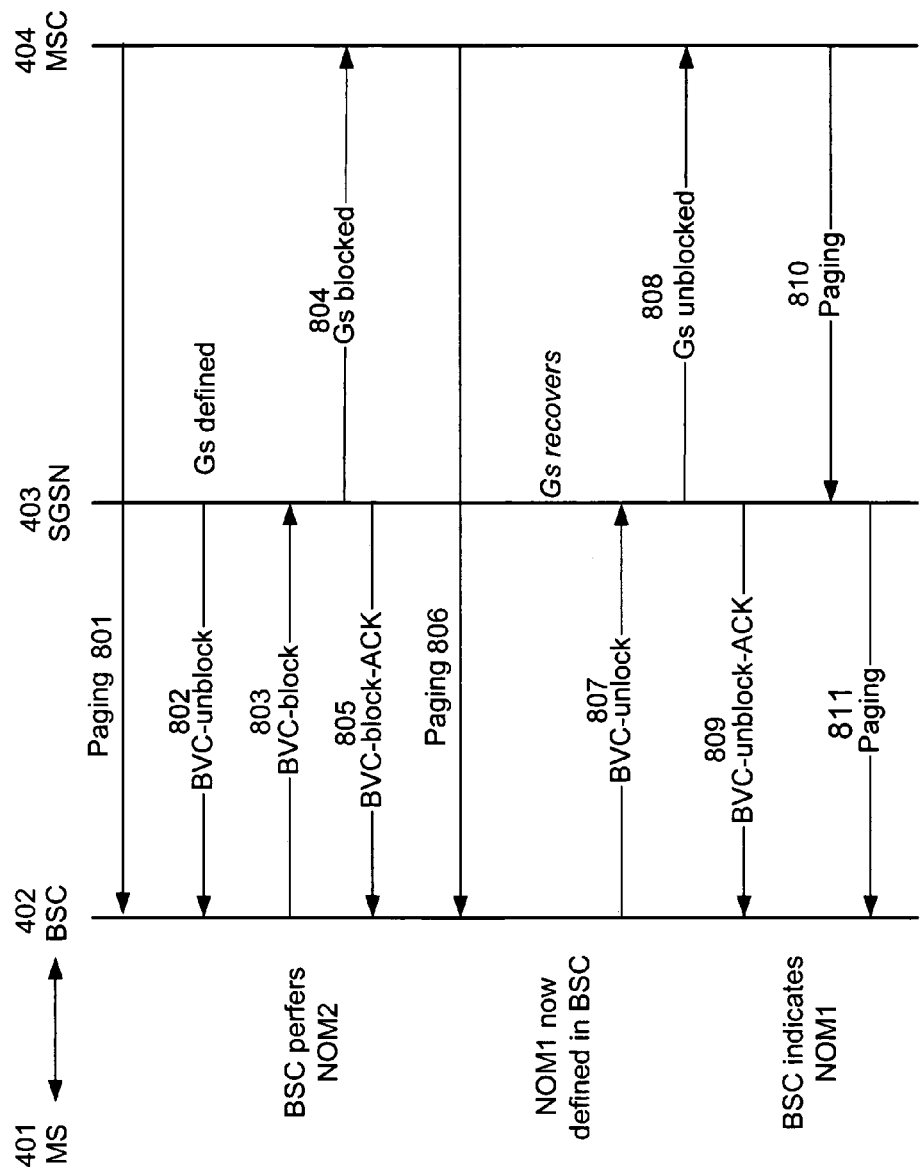
FIG. 8 is a timing diagram for coordinating operating modes of a GPRS network according to a fourth embodiment of the present invention.

Therefore, by applying the BVCI, the methods of FIGS. 5 and 6 employed by the system of the present invention can be revised to be the embodiments as shown in FIGS. 7 and 8.

FIG. 7 illustrates a third embodiment revised from the method of FIG. 5 after embodying the BVCI concept. Similar to the embodiment of FIG. 5, NOM1 is the primary operation mode and NOM2 is the secondary operation mode. Therefore, as shown in arrows 701 and 702, in NOM1, paging messages are sent from MSC 404 to SGSN 403 and from SGSN 403 to BSC 402.

When interface Gs fails, instead of sending the failure indication message, SGSN 403 sends a BVCI-blocked message 703 to BSC 402 indicating that interface Gs fails and NOM1 is no longer available. In response to the BVCI-block message 703, BSC 402 sends a BVC-blocked acknowledge message 704 to SGSN 403 indicating that NOM2 should be used. Afterward, MSC 404 sends the paging messages to BSC via interface A, as is in NOM2.

Similarly, when interface Gs recovers, SGSN 403 sends a BVCI-unblocked message 706 to BSC 402 indicating that NOM1 is now available. BSC 402 in turn responds to this message by sending a BVCI-unblocked acknowledge message 707 indicating that the recovery is accepted. Afterward, MSC 404 sends the paging messages to BSC 402 through SGSN 403, i.e., through interface Gs and Gb, as shown in arrows 708 and 709.

FIG. 8 shows a fourth embodiment revised from the method of FIG. 6 after embodying the BVCI concept. Similar to the embodiment of FIG. 6, NOM2 is the primary operation mode (this is given that all MSs support NOM1.) Therefore, as shown in arrows 801, in NOM2, paging messages are sent from MSC 404 to BSC 402 via interface A.

As described above, SGSN 403 reports a change of the status of interface Gs to BSC 402 whenever the change occurs, as shown in arrow 802. However, BSC 402 is not in the position to support NOM1 and it indicates this by automatically blocking the BVCI, as shown in arrow 803. The SGSN responds with a BVC-block acknowledgement in arrow 805 and blocks the Gs interface in arrow 806. When the BSC is prepared for NOM1, it unblocks the BVCI, as shown in arrow 807. The SGSN responds by unblocking the Gs interface in arrow 808 and acknowledges the BVC unblock to the BSC in arrow 809. The BSC now receives and transmits signals as per NOM1, that signals are sent from MSC 404 to SGSN 403 and then to BSC 402, as shown in arrows 810 and 811.

Figure 9:
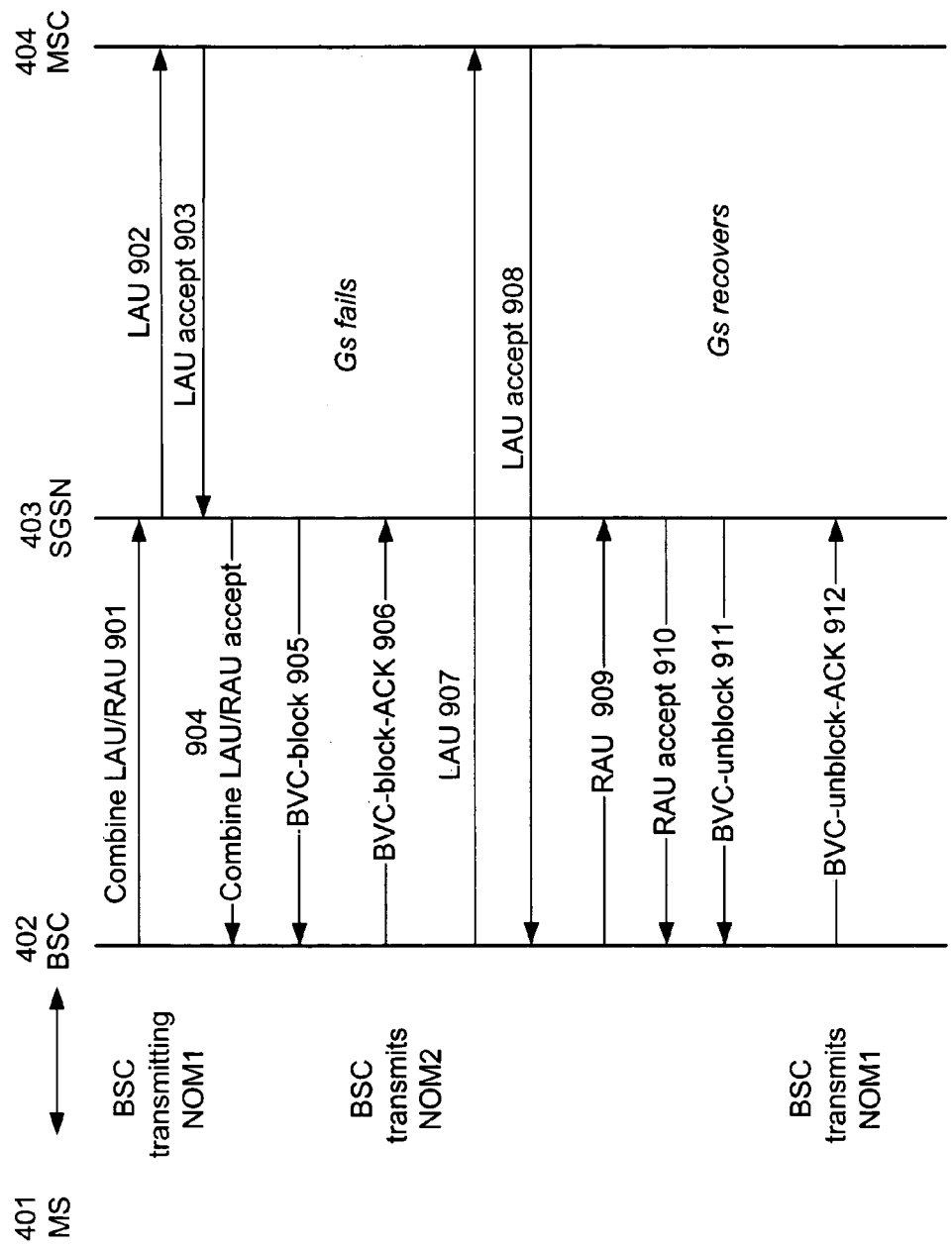
FIG. 9 is a timing diagram for coordinating operating modes of a GPRS network according to a fifth embodiment of the present invention.

FIG. 9 illustrates a timing diagram showing a signal routing when a MS sends signals to the network in accordance with the present invention. As shown in the figure, MS 401 sends a signal to the network through BSC 402 via an operation mode that BSC 402 supports. When BSC 402 supports NOM1, BSC 402 sends combined LAU (Location Area Update)/RAU (Routing Area Update) signals to SGSN 403 in arrow 901 and SGSN 403 in turn sends a LAU signal to MSC 404 in arrow 902. When Gs exits, MSC 404 accepts the LAU signal and sends a LAU accept signal back to SGSN 403 so that SGSN 403 sends a combined LAU/RAU accept signal to BSC 402, as shown in arrows 904 and 904. Accordingly, BSC-transmits signals to MSC 404 through SGSM 403 via NOM1.

When Gs fails, i.e., NOM 1 is no longer available, SGSN 403 sends a BVC-block signal to BSC 402 in arrow 905. BSC 402 acknowledges the signal by sending a BVC-block ACK signal in arrow 905 and transmits the signals to MSC 404 directly through NOM2. That is, BSC 402 sends LAU signals to MSC 404 and MSC 404 responds a LAU accept signal, as shown in arrows 907 and 908. When Gs is recovered, BSC 402 again sends a RAU signal to SGSN 403 in arrow 909. SGSN 403 responds the RAU signal by sending a RAU accept signals and a BVC-unblock signal to BSC indicating that NOM1 is now available, as shown in arrows 910 and 911. After BSC 402 returns a BVC-unblock ACK signal to SGSN 403 in arrow 912, BSC 402 again transmits network signals to MSC via NOM1.

In accordance with the present invention, the use of the BVCI ensures that the network can be used in NOM1 when NOM1 is indicated available. As the present invention reserves a singular BVCI value of the existing BVC to indicate the availability of NOM1, the use of BVCI does not change the protocol of the existing GPRS network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method for coordinating operation modes of a General Packet Radio Service (GPRS) network, comprising:
   monitoring a status of a Gs link between a Serving GPRS Support Node (SGSN) and a Mobile Switching Center (MSC);
   sending a Gs status message to a Base Station Controller (BSC) indicating the status of the Gs link;
   selecting an operation mode from a plurality of operations modes based on the Gs status message, wherein each of the plurality of operation modes specifies which one of a plurality of channels to use for circuit-switched pages and which to use for data packet pages;
   sending a first operation mode message from the BSC to a mobile subscriber (MS) instructing the MS to switch to the selected operation mode; and
   sending a second operation mode message from the BSC to the SGSN instructing the SGSN to switch to the selected operation mode.

2. The method of claim 1, further comprising sending an inquiry from the BSC to the SGSN, the inquiry requesting the Gs link status.

3. The method of claim 1, further comprising sending an inquiry from the BSC to the MSC, the inquiry requesting the Gs link status.

4. The method of claim 1, wherein sending the Gs status message to the BSC further comprises sending the Gs status message from the SGSN.

5. The method of claim 1, wherein sending the Gs status message to the BSC further comprises sending the Gs status message from the MSC.

6. The method of claim 1, wherein selecting the operation mode from the plurality of operations modes further comprises the BSC selecting the operation mode.

7. The method of claim 1, wherein sending the Gs status message to the BSC indicating the status of the Gs link further comprises sending a Gs failed message to the BSC indicating the Gs link has failed or sending a Gs operational message indicating the Gs link is operational.

8. The method of claim 1, wherein selecting the operation mode from the plurality of operations modes based on the Gs status message sent to the BSC further comprises selecting the operation mode from the plurality of operations modes based on a list of preferred operation modes, selecting a most preferred operation mode on the list that is compatible with the status of the Gs sent to the BSC.

9. The method of claim 8,
   wherein the list of preferred operation modes includes network operation mode one (NOM1), network operation mode two (NOM2), and network operation mode three (NOM3);
   wherein NOM1 specifies that both packet and circuit-switched pages are sent on a Common Control Channel (CCCH) to the MS, if the MS is not GPRS attached, wherein NOM1 specifies that both packet and circuit-switched pages are sent on a packet paging channel to the MS, if the MS is GPRS attached but is not assigned a packet data channel, wherein NOM1 specifies that circuit-switched pages are sent on a packet data channel to the MS, if the MS is GPRS attached and assigned the packet data channel;
   wherein NOM2 specifies that both packet and circuit-switched pages are sent on a CCCH to the MS; and
   wherein NOM3 specifies that circuit-switched pages are sent on a CCCH to the MS and packet pages are sent on a CCCH or a packet paging channel.

10. The method of claim 9, wherein NOM1 is compatible with the Gs in operational status, but not failed status, wherein NOM2 is compatible with the Gs in failed status, wherein NOM3 is compatible with the Gs in failed status.

11. A Base Station Controller (BSC) configured for coordinating operation modes of a General Packet Radio Service (GPRS) network, comprising:
    the BSC configured to receive a Gs status message indicating a status of a Gs link between a Serving GPRS Support Node (SGSN) and a Mobile Switching Center (MSC);
    the BSC configured to select an operation mode from a plurality of operation modes based on the status of the Gs sent to the BSC, wherein each of the plurality of operation modes specifies which one of a plurality of channels to use for circuit-switched pages and which to use for data packet pages;
    the BSC configured to send a first operation mode message to a mobile subscriber (MS) instructing the MS to switch to the selected operation mode; and
    the BSC configured to send a second operation mode message from the BSC to the SGSN instructing the SGSN to switch to the selected operation mode.

12. The BSC of claim 11, wherein the BSC is further configured to send an inquiry to the SGSN, the inquiry requesting the Gs link status.

13. The BSC of claim 11, wherein the BSC is further configured to send an inquiry to the MSC, the inquiry requesting the Gs link status.

14. The method of claim 11, wherein the BSC configured to receive the Gs status message further comprises the BSC configured to receive a Gs status message from the SGSN.

15. The method of claim 11, wherein the BSC configured to receive the Gs status message further comprises the BSC configured to receive a Gs status message from the MSC.

16. The method of claim 11, wherein the BSC configured to receive the Gs status message further comprises the BSC configured to receive a Gs failed message indicating the Gs link has failed or a Gs operational message indicating the Gs link is operational.

17. The method of claim 11, wherein the BSC configured to select the operation mode based on the status of the Gs received by the BSC and based on a list of preferred operation modes further comprises the BSC configured to select the operation mode most preferred on a list of operational modes ranked by preference, the selected operation mode compatible with the status of the Gs received by the BSC.

18. A method for a Base Station Controller (BSC) to coordinate operation modes of a General Packet Radio Service (GPRS) network, comprising:
    receiving a Gs status message indicating the status of a Gs link between a Serving GPRS Support Node (SGSN) and a Mobile Switching Center (MSC);
    selecting an operation mode from a plurality of operations modes based on the received Gs status message and based on a list of preferred operation modes, wherein each of the plurality of operation modes specifies which one of a plurality of channels to use for circuit-switched pages and which to use for data packet pages;
    sending a first operation mode message to a mobile subscriber (MS) instructing the MS to switch to the selected operation mode; and
    sending a second operation mode message to the SGSN instructing the SGSN to switch to the selected operation mode.

19. The method of claim 18, further comprising sending an inquiry to the SGSN, the inquiry requesting the Gs link status.

20. The method of claim 19, further comprising sending an inquiry to the MSC, the inquiry requesting the Gs link status.

21. The method of claim 18, wherein receiving the Gs status message indicating the status of the Gs link further comprises receiving a Gs failed message to the BSC indicating the Gs link has failed or receiving a Gs operational message indicating the Gs link is operational.

* * * * *